US007072697B2

(12) United States Patent
Lappeteläinen et al.

(10) Patent No.: US 7,072,697 B2
(45) Date of Patent: Jul. 4, 2006

(54) METHOD AND DEVICE FOR TRANSPONDER AIDED WAKE-UP OF A LOW POWER RADIO DEVICE BY A WAKE-UP EVENT

(75) Inventors: Antti Lappeteläinen, Espoo (FI); Tapani Ryhänen, Helsinki (FI); Mauri Honkanen, Tampere (FI); Jari Hyyryläinen, Veikkola (FI)

(73) Assignee: Nokia Corporation, Espoo (FI)

( * ) Notice: Subject to any disclaimer, the term of this patent is extended or adjusted under 35 U.S.C. 154(b) by 398 days.

(21) Appl. No.: 10/279,741

(22) Filed: Oct. 22, 2002

(65) Prior Publication Data

US 2004/0077383 A1    Apr. 22, 2004

(51) Int. Cl.
*H04M 1/00* (2006.01)
(52) U.S. Cl. .................. 455/574; 455/41.1; 455/343.5
(58) Field of Classification Search .............. 455/41.1, 455/41.2, 426.1, 426.2, 552.1, 73, 40, 574, 455/343.5; 340/10.33, 572.1
See application file for complete search history.

(56) References Cited

U.S. PATENT DOCUMENTS

| | | | |
|---|---|---|---|
| 5,541,976 A * | 7/1996 | Ghisler | 455/426.1 |
| 5,621,412 A | 4/1997 | Sharpe et al. | 342/51 |
| 5,806,007 A * | 9/1998 | Raith et al. | 455/574 |
| 5,995,540 A * | 11/1999 | Draganic | 375/222 |
| 6,424,820 B1 * | 7/2002 | Burdick et al. | 455/41.1 |
| 6,593,845 B1 * | 7/2003 | Friedman et al. | 340/10.33 |
| 6,745,027 B1 * | 6/2004 | Twitchell, Jr. | 455/422.1 |
| 6,754,562 B1 * | 6/2004 | Strege et al. | 700/279 |

FOREIGN PATENT DOCUMENTS

EP    1098283 A3    5/2001

* cited by examiner

*Primary Examiner*—Tilahun Gesesse

(57) ABSTRACT

A method, software tool, computer program product and low power radio device are provided for transponder aided wake-up and connection set-up by detecting a wake up event in a sleep mode of the low power radio device, putting the radio device into an operative state, transmitting at least one advert message by radio transmission, wherein the low power radio devices put into a passive mode for a predetermined period of time in case no answer is received in response to the at least one transmitted advert message.

20 Claims, 7 Drawing Sheets

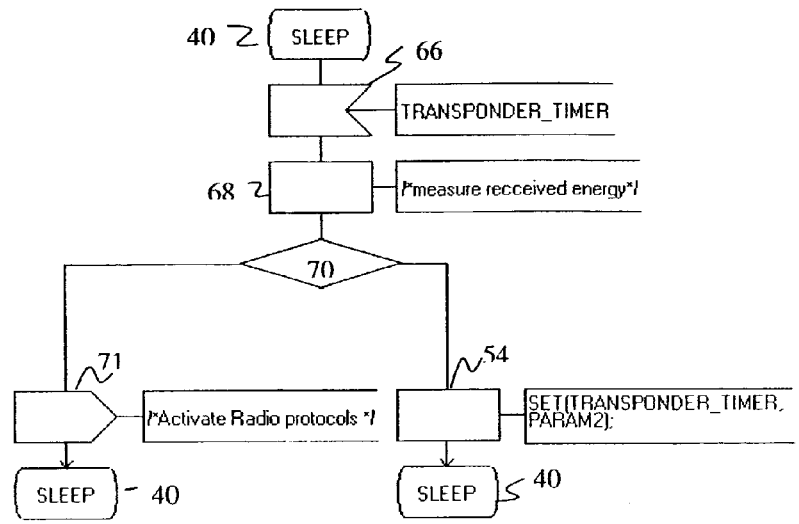
Fig. 9
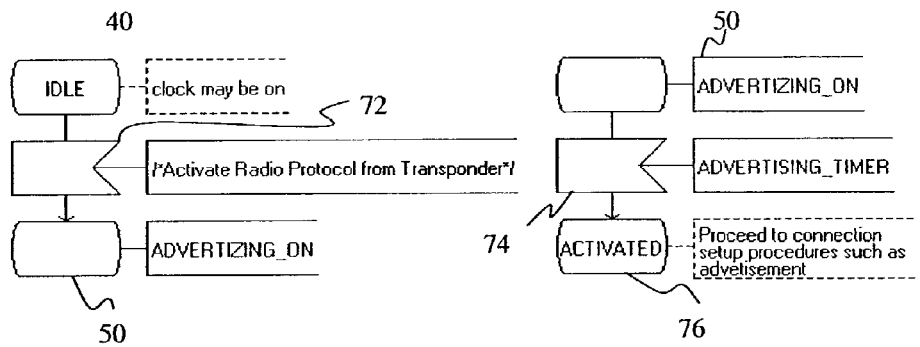
Fig. 10        Fig. 11
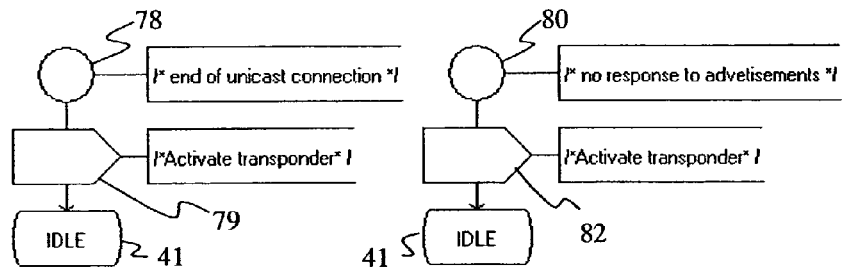
Fig. 12        Fig. 13

|  | Mode 1 | Mode 2 | Mode 3 | Mode 4 | Mode 5 |
|---|---|---|---|---|---|
| Battery | Off | On | On | On | On |
| Power management block 139 | Off | On | On | On | On |
| Ultra low power microcontroller 120 | Off | Off | On | On | On |
| Measurement interface 124 | Off | Off | Off | On | On |
| Rx/Tx Block 110 | Off | Off | Off | Off | On |

METHOD AND DEVICE FOR TRANSPONDER AIDED WAKE-UP OF A LOW POWER RADIO DEVICE BY A WAKE-UP EVENT

BACKGROUND OF THE INVENTION

The invention relates to setting up a connection between two wireless low-power devices. When two devices want to connect to each other some kind of notification of the need for connection must be made. Devices may signal their need all the time or every now and then. Compromises must be made to save batteries power, especially in small, simple devices meant for goods for sale. For example a CD-disc might have a small electronic chip in its cover and when a customer wants to know more about the CD he would get a URL to his Bluetooth device from the chip.

This problem can be solved by a system where all devices send advertising signals periodically and they listen on the same frequency for a while for reply (time driven). In this case the device, which sends the reply message, communicates the need for connection. This beacon like solution has the disadvantage that independent from the actual use, the operation time is limited by the battery power and the average power consumption for operation of the beacon.

The power consumption is the critical element of battery powered devices that use a short range radio link. The connection setup requires that the low power radio module is either advertising itself or listening periodically other advertising devices. For this reason, the radio system needs to be activated periodically, typically with a duty cycle below 1%. Thus, the device is using some power in trying to setup a connection even if there are no other devices in the vicinity and the lifetime of the battery becomes a limiting factor.

Wireless communication between two battery driven (non-plugged) devices places special criteria to device discovery (idle mode operation from the radio perspective) since usually neither device can be continuously active. Hence, a trade off between connection setup, power efficiency and range is inevitable. In Bluetooth (BT) this trade-off is solved by compromising the connection set-up delay and as well as the idle mode duty cycle. See BT baseband specification.

In this scheme all devices send a device advertising message in a predefined frequency after which they listen in the same frequency for possible responses for a short period of time. In other words, the radio parts of the low power device will be activated in a time driven fashion, where the activation interval is application driven and it is based on the connection set-up delay and power efficiency needs of the device. Whereas the response to a time driven advertising message is event driven, i.e. the responding device has a need to establish a connection with the advertising device.

A natural enhancement to the discovery scheme would be that the device having the need to establish the connection sends a wake up message in order to avoid unnecessary periodical advertisement, which consumes power. A method to achieve this is that the sleeping device turns regularly only on its RF front end LNA (low noise amplifier) and a RSSI (relative signal strength indicator) measurement unit, (i.e. has a transponder) to detect whether received energy level exceeds a threshold, which will then be considered as a wake-up message. Compared to periodical advertisement which requires ramp up for whole transmission and receiving chains this is clearly more power efficient. Unfortunately, if only RF front end and LNA were activated all energy inside the band filter would be included in the RSSI measurement and e.g. in the 2.4 GHz ISM a microwave oven could turn the device active continuously, i.e., the power efficiency gain is lost.

The following basic technologies are provided:
a transponder architecture (see FIG. 2),
a transponder using RF field energy for wireless sensors (see FIG. 3), and the technical implementation of the suitable power detector for the concept (see FIG. 4).

A connection set up protocol, which includes predefined channels for devices or people to broadcast their presence is known a priori.

An improvement would be that the device which wants to establish a connection would make the initiative step. Now the sleeping device to which the connection is intended listens for the wake-up signals with a transponder or other suitable sensor (event driven). So there is no need for periodical advertising signals and power can be saved. Similar solutions are known in naval navigation as "racon" systems.

One problem is that the transponder (or other sensor) may activate from any energy on the frequency band such as other Bluetooth-/WLAN-(Wireless Local Area Network)/ISM-(Industrial, Scientific, and Medical Frequency band at 2.4 GHz) devices, microwave ovens etc.

The first time driven system will work well in areas with an increased radio level such as towns with a lot of radio frequency emitting devices such as baby-phones, low power walkie-talkies, radio controlled central-locking for cars and the like.

The second event driven system will work well in areas with a reduced radio level such as countrysides with nearly no radio frequency emitting devices.

The state of the art does not provide a solution that can be applied in urban as well as in the country i.e. in highly and lowly radio frequency polluted areas.

All the above approaches for a wake up and communication setup are not suitable for the use environments in which the ISM band activity is not known. Therefore, a wake up and communication setup method and device architecture is needed which is capable to overcome these problems.

SUMMARY OF INVENTION

It is therefore desirable to have a solution for a low power electronic device capable of being operated with the lowest possible power consumption independent from the actual environmental conditions.

It is further desirable to have a method for operating a low power electronic device with transponder aided wake-up and connection set-up with the lowest possible power consumption independent from the actual environmental conditions.

In one embodiment of the present invention a method for transponder aided wake-up and connection set-up of a low power radio device is provided. The method comprises detecting a wake up event in a sleep mode of said low power radio device, e.g. a field strength indicating signal, and putting said radio device into an operative state. In the operative state, the device transmits at least one advert message by radio transmission. The method is characterized by putting said low power radio device into a passive mode for a predetermined period of time, in case no answer in response to said at least one transmitted message is received.

It is to be noted that the mentioned transmission of at least one advert message can comprise multiple transmissions of a number of advertisements e.g. five or more transmissions of a single advertisement on a certain channel. It is not intended to limit the present invention to just a single transmitted advertisement. The transmission of said at least one advert message can comprise a period of time, wherein a time driven advertisement is used. The time the device waits for a reply can also be set to a predetermined period.

The passive mode is a mode where a wake up event is not detected at all, or wake up events are detected, but no connection set up actions are done based on the wake up event. The passive mode may distinguish between different types of wake up events such as measured energy and e.g. direct input by activating the device by a switch overriding the passive mode.

According to present connection set up procedures, the detection of a wake up event can be related to different time frames such as advert repetition duration, energy scanning duration and energy measurement duration of said low power radio device. The advert repetition duration is a value related to the time between two successive advertisements or energy transmissions to be received by a device during connection setup. The advert repetition duration can be shorter than the time between two expected successive advertisements to ensure that at least every second advertisement can be received and detected as a wake up event. The advert repetition duration can be shorter than the period of a single expected advertisements to ensure that each transmitted advertisement can be detected as a wake up event. The advert repetition duration represents the time period the device is put to said passive mode.

The energy measurement duration represents the sampling time for detecting an energy within a scanning duration. The energy measurement duration is to be related to the properties of an expected wake up event, e.g. the duration of an energy burst or an advertisement of an opposite device. The energy measurement duration can be related to the physical measurement accuracy of the low power radio device.

The scanning duration is related to the time wherein a measurement is possible, before the device enters the passive mode. To reduce the number of energy measurements, only one energy measurement can be executed in each scanning cycle. To enable a set of measurements, the device can use a number of successive scanning duration to execute a number of energy measurements.

It is clear that the time periods defined by these three values can nearly be arbitrarily chosen. But as set forth above, the advert repetition duration should be shorter than the time between two expected successive advertisements. The energy scanning duration should be longer than the energy measurement duration, to enable at least one complete measurement. To achieve maximum power savings, the advert repetition duration should be longer than the scanning duration. The relation between the advert repetition duration and the scanning duration, defines the duty cycle of the device in an environment with high ISM activity. The sum of the scanning duration and the advert repetition duration represents the cycle time of the device in a time driven mode in an environment with high ISM activity.

The wake up event can be defined by the reception of an RF energy, e.g. by an output voltage of an RF detector. The wake up event can also comprise a threshold to ensure that an adverting or transmitting device is actually close. With a threshold, a wake up event can be defined if the measured energy exceeds said energy threshold during a set duration of the energy scanning or energy measuring. Said energy threshold can be defined in relation to desired operational range of said low power radio. The threshold can also be adaptive to enable a device to expel distant low energy sources from triggering a wake up event.

So in the present invention a purely transponder operated (event driven) connection set up is expanded to an event driven method with a dead time. The dead time adds a time driven feature to the method preventing a continuous transmission of advertising messages, in case a radio source such as a microwave oven produces a continuous wake up event. So compared to a periodical advertisements on a predefined channel leading to inefficient power usage for some applications, in cases where there are seldom other devices in the vicinity, the method of the present invention only transmits, in the case of a detected wake up event.

Compared to event driven wake-up methods, wherein transponders may react to energy of undesired devices, e.g. microwave ovens WLANs, Bluetooth etc., the method according to the invention prevents that a low power radio device wastes energy trying to contact a device being actually not present.

As can be seen, the invention is combining the good features of the time and event driven approaches. This results in that
   in sparsely populated areas (hardly any activity in the ISM band) the system can work as power efficiently as the pure event driven approach, and
   in the dense populated areas (a lot of the ISM band activity) the system can work almost at as power efficiently as the pure time driven approach.

The benefit is illustrated in the diagram of FIG. 1.

In another example embodiment, the method further comprises setting up a connection and transmitting data to a device, if an answer is received from said device. This enables the transponder to set up connections like a conventional transponder. The method maybe extended with a transponder dead time even after a successful wake up and connection set up, to expand the operation time.

It may be noted that the step of putting the device into an operative state may be skipped, in case e.g. the timer or another component is already active.

In another example embodiment, the method further comprises detecting a second wake up event in said passive mode of said low power radio device, determining weather said device is in a passive mode and remaining in the passive mode, discarding said wake up event. This can be done e.g. by requesting a timer started during a first unsuccessful connection set up attempt on entering said passive mode.

The detection of a second wake up event in said passive mode of said low power radio device can also induce a transition of said radio device into a partially operative state, to determine if said device is still in the passive mode e.g. said predetermined period of time has expired, and returning to said passive mode, if said predetermined period of time has not expired.

If said time has expired or has not been in a passive mode, the device can put itself directly to an operative state.

In another example embodiment, the method further comprises, putting said radio device into an operative state, after said predetermined period of time has expired. This wake up procedure adds a time driven wake up feature to the low power radio device, started after an unsuccessful connection set up attempt.

Another example embodiment the method further comprises the activation only of necessary radio components, which are needed to detect said wake up event. This activation is to be executed prior to said detection of said wake up event. In case that the wake up event is a measured energy level over the whole operational frequency band of said low power device, said necessary radio components include an antenna, a power detector and means to convey said received energy level information to radio control unit. The necessary radio components can further comprise a filter and a low noise amplifier, to be able to detect a transmitted RF energy over distances of more than a few mm. The device is in the sleep mode, when the necessary radio components to detect a wake up event represent are active.

In an additional example embodiment, the method further comprises transmitting an advert message, after putting said radio device into an operative state. Together with the time driven wake up, procedure, the device can additionally provide a time driven wake up and connection set up procedure, as known from the state of the art. So a controller or another logic element may decide which of the two modes is to be used for operating the low power radio device. This can be done e.g. by counting wake up events and unsuccessful communication set up attempts comparing the two numbers and if the relation is above or below a certain threshold, the device is operated in a time driven mode e.g. for a certain period.

In yet another example embodiment said detecting of said wake up event comprises receiving energy transmitted from another device, amplifying said received energy, and detecting the increased energy level after amplifying. To carry out the detecting of said wake up event, only an amplifier is needed, and the power consumption of a single amplifier is much lower than the power consumption of a whole receiver. To reduce the risk of misinterpretations, the received energy may be filtered by a filter, inserted between the antenna and the amplifier, to provide a frequency preselection. This filter can be a passive filter, which consumes no power.

In another example embodiment, said detecting of said wake up event comprises receiving transmitted energy from another device in a determined frequency band, and utilizing the received energy for waking up said device. This can be done e.g. with the detector circuit depicted in FIG. 4. With this wake up method, the device is not consuming power in the sleep mode at all, and can be waked up by receiving radio energy. In a simple case, the detector is connected to a battery switch, setting the device under power, if radiated energy is received.

In yet another example embodiment said wake up event comprises receiving a sensor output from a sensor in said radio device responding to physical contact. This enables the device to be put in an operative state e.g. by galvanic touching of the device in idle mode, or by pressing a button on said device, to wake up said low power electronic device. A button or a switch offers two useful features. The device can be waked up from a sleep mode by touching, even if the battery power is too low for providing an event driven or time driven wake up and connection set up mode. A switch can be used to start the low power device only when delivered to an operation environment. So the low power device can be stored in a switched off state, and can be set into operation if delivered to a store for selling.

In another example embodiment said wake up event comprises receiving a sensor output from a proximity sensor in said radio device. The proximity sensor can use a capacitive or an optical detection of movement or presence. The sensor can be embodied as a photo diode, or a capacitive surface or the like.

According to yet another aspect of the invention, a software tool is provided comprising program code means for carrying out the method for transponder aided wake up and connection set up of the preceding description when said program product is run on a computer or a radio device.

According to another aspect of the present invention, a computer program product downloadable from a server for carrying out the method for transponder aided wake up of the preceding description is provided, which comprises program code means for performing all of the steps of the preceding methods when said program is run on a computer or a network device.

According to yet another aspect of the invention, a computer program product is provided comprising program code means stored on a computer readable medium for carrying out the method for transponder aided wake up and connection set up of the preceding description when said program product is run on a computer or a radio device.

According to another aspect of the present invention a computer data signal is provided. The computer data signal is embodied in a carrier wave and represents a program that makes the computer perform the steps of the method contained in the preceding description, when said computer program is run on a computer, or a network device.

Such a software is useful if used in multi purpose low power radio devices using e.g. a software tools as a timer for providing said predetermined period of time, or other components conventionally manufactured as hardware components.

According to another aspect of the present invention, a low power radio device is provided, being capable of transponder aided wake-up and connection set-up. The low power radio device comprises a transponder, and a state controller. The transponder is adapted to respond to received radio transmission for setting up a radio connection for transmitting data, said transponder circuit comprises, a transceiver and a transponder controller connected to said transceiver. The transponder comprises a transceiver and a transponder controller, wherein said transponder controller is adapted to control the transceiver and to respond to received radio transmission for transmitting data.

The state controller is adapted to control the operative state of said low power radio device, and comprises a detector adapted to detect a wake up event in a sleep mode of said low power radio device and to notify said state controller to put said device into an operative state, if a wake up event is detected. Said state controller is connected to said transponder and is adapted to put said low power device to a passive mode, according to signals received from said transponder. Said signals can indicate that no data transfer is possible or that a data transfer is terminated. Said low power radio device is characterized by a timer, which is connected to said state controller. The timer is adapted to be activated by said controller, in case the controller is powering down said low power device or puts said low power electronic device to a passive mode. The timer is adapted to be active for a predetermined period of time, and to prevent that the device is put to an operative state by a notification from said detector while said timer is active.

The transceiver usually comprises an antenna, an antenna interface for transmitting and receiving. The transceiver can be embodied as a radio baseband block for communication used by the device and the transponder. The detector can be a RF-to-DC converter, i.e., Schottky diode based converter, as depicted in FIG. 4. The state controller can comprise e.g. a comparator to compare the voltage delivered from the detector with a pre-selected threshold voltage, to wake up the device if said threshold is exceeded. It may be noted that the transponder controller and the state controller can be implemented in a single integrated circuit or one chip.

In another example embodiment the low power radio device further comprises a data interface connected to said controller, for exchanging data with components of said low power radio device connected to said transponder controller. The components can be sensors, actuators or simply a memory to retrieve information or data stored in said low power electronic device. The other components has not been described in detail to not obscure the description with details depending only on the actual use of the low power electronic device.

In yet another example embodiment said low power radio device further comprises a battery and a power switch to connect and disconnect said battery to said low power radio device. The power switch is connected to said state controller, to be operated. Depending on the actual embodiment, the timer can comprise an output to inactivate the power switch, to prevent a wake up from a passive mode while the timer is active.

The timer can be connected to the input of the power switch, disconnecting the wake up circuit from the power switch to prevent that the device is powered up while the timer is active. The timer can be connected to the detector to short circuit the output or the input of the detector.

In another example embodiment, said low power radio device comprises a fully operative state, a fully powered down state and at least one partially operative state. This can be embodied e.g. by a selective power switch, capable of powering up only parts of said low power device. So depending on the actual sleep mode or passive mode different components of said low power radio device can be cut off from the power supply. e.g. in a sleep mode only the detector is supplied with a bias voltage. A first partially operative state comprises an operating of the timer, a second partially operative state comprises a powered up operation state controller. A third partially operative state can comprise an active transponder and or an active transceiver, and a fully operative state includes powered up additional components of said low power radio device like a memory, storage, sensors and actuators.

In another example embodiment, said low power radio device further comprises at least one sensor responding to physical proximity. So the device can activated by the output of a proximity sensor. The sensor can be a passive sensor to prevent that the sensor is consuming power while not detecting the proximity of a user or another device. The proximity sensor can be a button for overriding the timer for powering up the low power radio device. The output of said proximity sensor can be connected to said detector, to use the detector to power up said low power radio device. The sensor can be connected to a timer stop or timer reset to enable a kind of "manual override" of said timer.

In yet another example embodiment said transceiver further comprises an antenna switch to connect an antenna to said transceiver or to said detector. The antenna switch enables the device to use the received radio energy to wake up the device, without the detour via the receiver. This enables the device to detect a wake up event without operation a power consuming receiver. The antenna switch can be embodied as a three way switch to switch the antenna between the detector (in sleep mode), the transmitter of said transceiver (while transmitting), and a receiver of said transceiver (while receiving). The three way switch, is normally connected to said detector and is controlled by the operational state controller, while the connection between the transmitter and the receiver of said transceiver is controlled by said transponder controller. In the simplest case the antenna switch is normally connected to the detector, and is only operated by the transponder controller, only operable in an operative state of the transponder controller.

In another example embodiment said low power radio device further comprises an amplifier connected between said antenna and said antenna switch. This embodiment enables the device to increase the sensibility of said detector to weak radio signals, without the need to operate the receiver stage of said transceiver.

BRIEF DESCRIPTION OF THE DRAWINGS

In the following, the invention will be described in detail by referring to the enclosed drawings in which:

FIG. 6 is a flow chart of a wake up method according to one embodiment of the present invention, FIGS. 7 to 14 describe various variations applicable to the basic method of FIG. 6, wherein

FIG. 9 depicts another extension of the method by extending the detection of a wake up event in FIG. 6.

FIG. 10 depicts another extension of the method of FIG. 6 where the device activates the radio protocols from the transponder and transmits the advertisements.

FIG. 11 depicts another variation of the method of FIG. 6, wherein the transmission of the advertisement is controlled by a second timer to provide a timeframe for the advertisement and the connection setup.

FIG. 12 depicts another variation of the present invention, wherein the device activates the transponder after a successful data transfer before returning to an idle mode.

FIG. 13 depicts another variation of the present invention, wherein the device activates the transponder following the reception of no response to the advertisement before returning to an idle mode.

In other instances, detailed descriptions of well-known methods, interfaces, devices, and signaling techniques are omitted so as not to obscure the description

DETAILED DESCRIPTION OF PREFERRED EMBODIMENTS

Figure 1:
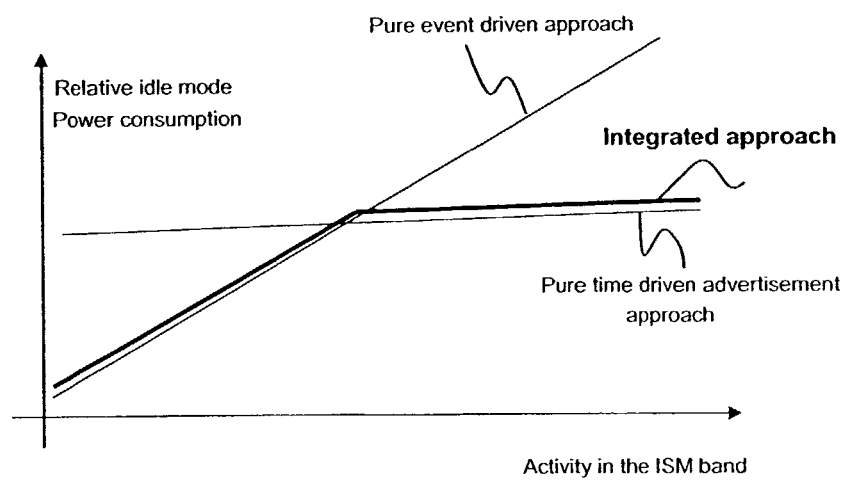
FIG. 1 is a diagram illustrating the relation ship between power consumption and activity in the radio band of conventional low power radio devices and a low power radio device according to the present invention

FIG. 1 illustrates the benefit of the invention compared to a purely time driven and a purely event driven approach. The actual shape of curves and differences between curves depend on various implementation parameters, usage scenarios and environment.

Figure 2:
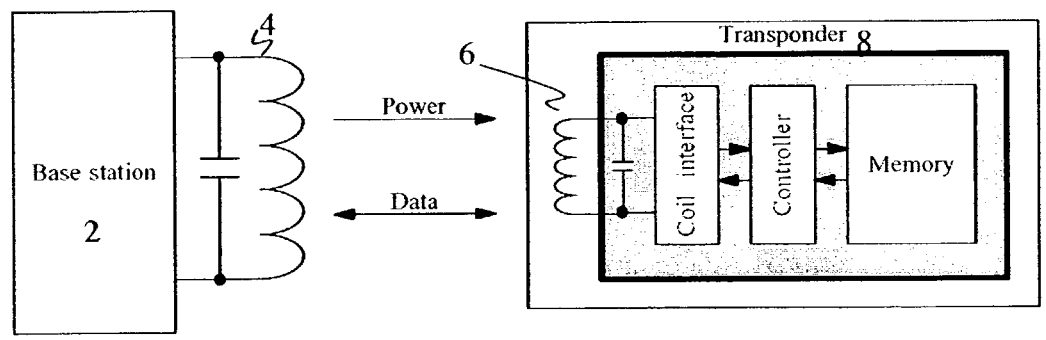
FIG. 2 is a block diagram of a transponder according to the state of the art.

FIG. 2 is a block diagram of a transponder according to the state of the art. The conventional transponder 8 comprises an antenna depicted as the coil 6 connected to an antenna interface. The antenna interface is connected to a controller which is in turn connected to a data storage. In the figure there is also a depicted a base station 2 with an antenna 4. The standard operation of the system is that the transponder is waiting for an incoming message received via the antenna 6. In response to an incoming message the controller retrieves data from a memory and transmits the data via the antenna 6. In the present example the transponder is powered by radio energy received via the coil 6 and rectified in the coil interface. Such transponders are known from keyless access systems, transponder implants for pets or economically useful animals for identification and the like. The range of such systems is limited to a few centimeters and the data storage capacity is limited to a few ten bits. For more data to be retrieved from the transponder the storage capacity is not sufficient. The data transfer is limited by the amount of transferable and storable energy and the average transmission power consumption.

Figure 3:
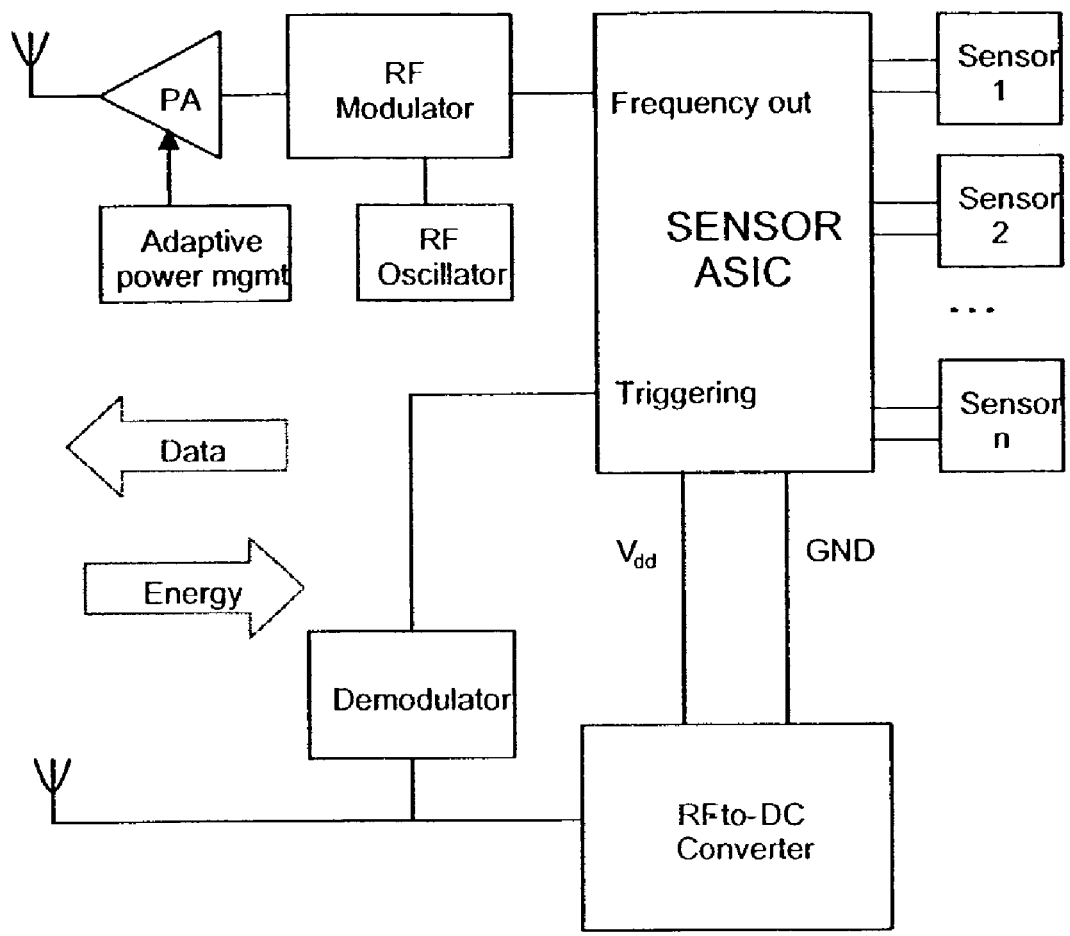
FIG. 3 is a low power radio sensor transponder capable of a low power wake up procedure according to the state of the art.

FIG. 3 is a low power radio device capable of a low power wake up procedure. Similar to the transponder depicted in FIG. 2, the depicted transponder can use a received radio frequency power to wake up the device. a received radio energy is rectified in the RF to DC converter to wake up said sensor ASIC (Application specific IC) the demodulator demodulates a received RF signal and transfers the demodulated signal to the sensor ASIC. The ASIC can read out the sensors after the wake up event and generate a message containing the sensor values. The message is then transmitted via the RF modulator, the amplifier and the transmission antenna. The adaptive power management is connected to the amplifier is to provide a RF output signal with a definite power.

As in the case of the transponder depicted in FIG. 2, the transponder responds to each received RF signal regardless of whether said signal is actually requesting sensor data or is just a strong background or noise signal.

Figure 4:
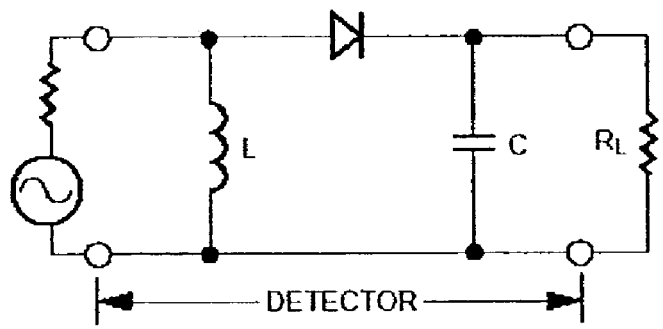
FIG. 4 is a high frequency detector according to the state of the art.
Figure 5:
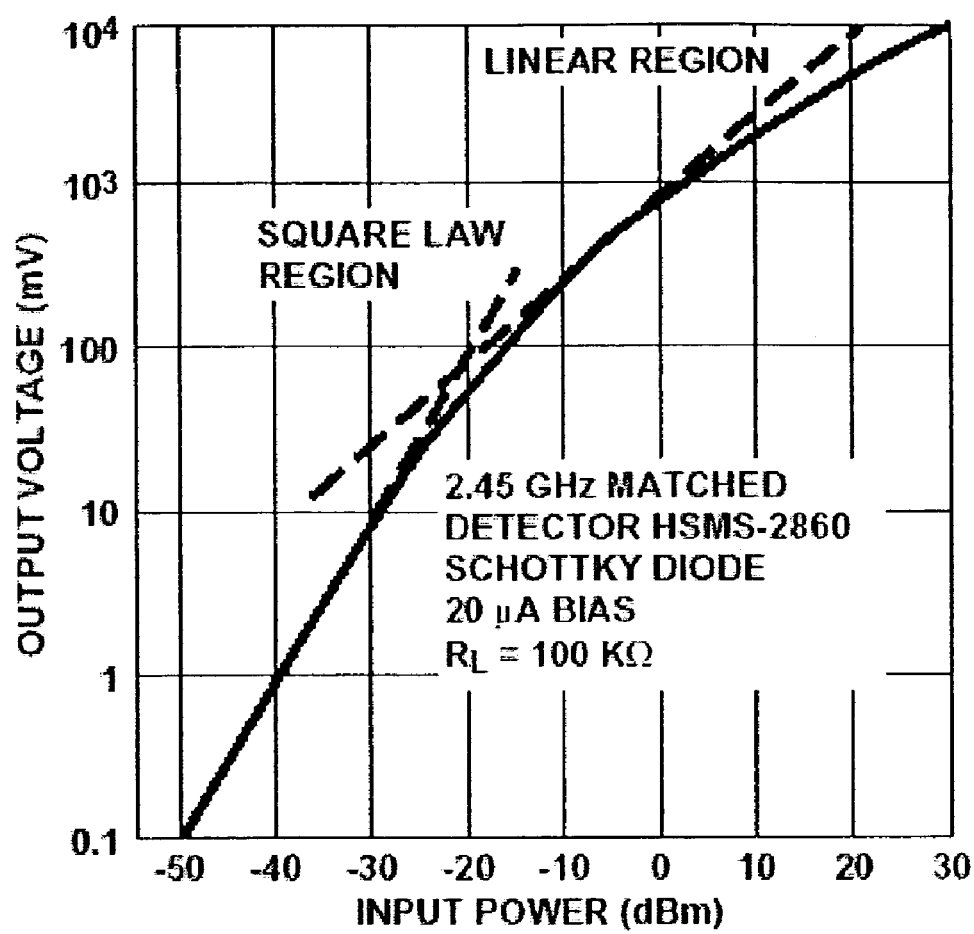
FIG. 5 depicts the relation of input RF power to output DC voltage of a detector according to one embodiment of the present invention.

FIG. 4 is a high frequency detector according to the state of the art. The figure depicts at the left side a high frequency source with an internal resistance depicted as the resistor connected in series to the RF source. The detector itself is constituted by an impedance L, a capacitance C and a Schottky diode. The value of the impedance has to be selected to suppress DC voltages in the RF side of the detector, and the value of the capacitor C has to be selected to suppress RF components in the output of the detector. By selecting the values of the capacitor and the impedance, the detector can be tuned to a certain frequency. The Schottky diode is capable of rectifying even RF alternating voltages, as the switching time of this kind of diodes is very low. The relation of input power to output voltage is depicted in diagram of FIG. 5.

Figure 6:
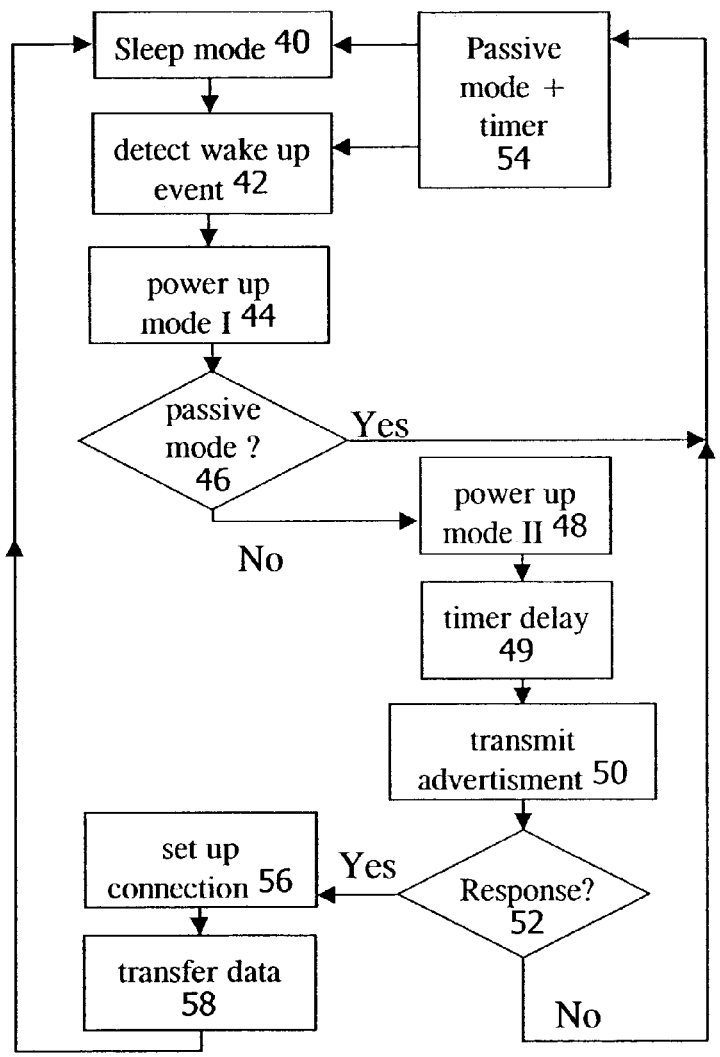

FIG. 6 is a flow chart of a wake up method according to one embodiment of the present invention. As in the case of the prior art, the method starts from a sleep mode or idle mode 40 of the low power radio device. In a second step of the invention, a detector detects a wake up event 42. A wake up event can e.g. be the detection of an energy level at the antenna above a predetermined threshold. After the detection of said wake up event, the device enters a first operative status 44 by activating or waking up a controller. The controller determines, if the device is actually in a passive mode e.g. by reading out the status of a timer and suppresses the detected wake up event if the device is in the passive mode and returns to the passive mode 54 (without resetting the timer). In the case the device is not in the passive mode, the controller puts the whole low power radio device to a fully operative status, power up mode II 48. After the device has reached the fully operative power up mode II 48 a timer controlled delay 49 is activated to prevent that the present device starts transmitting advertisements simultaneous with other devices present. A single wake up event e.g. in a CD store with hundreds of such devices would otherwise lead to a great number of simultaneously transmitted advertisements jamming the reply frequency and making a connection setup impossible. After the delay, the device transmits 50 at least one advertisement message via a transmitter, and waits for a response within a defined time frame. If a response is received, the device sets up a connection according to known protocols 56 and transmits data 58, and then returns to the initial sleep mode 40, without entering the passive mode 54. If the device dos not receive a response 52 to the advertisement, the device activates a timer 54 and enters a passive mode 54 for the time said timer is active. So if the device can not set up a connection it estimates that the device responded to a noise signal, and closes the receiver for a predetermined period of time, to prevent the waste of energy related to the transmission of an unnecessary advertisement. After the timer has run out, the device returns from the passive mode 54 to the initial sleep mode 40.

A device having a need for establishing a connection (or inquiring about the services and devices around itself) transmits an energy burst, which has a time duration that is longer than the run time of said timer. Next it tunes in for listening in the predefined frequency in which the advertisements are transmitted.

The low power device in idle or sleep mode can activate its transponder at least in every time the timer runs out. After such an automatically generated advertisement, the device can return to the initial sleep mode 40, to prevent that the device is getting hooked up in a passive mode loop. If an energy level of above a predetermined threshold is measured, a single advertisement is activated or a time driven periodic advertisement process is activated for a certain second time period.

This method combines the best features from time driven and event driven solutions.

The sleeping device listens to the neighborhood

If it detects enough energy it sends an advert message

Listens for a reply for some time

Closes the transponder

If a reply to the advert is received the connection may be established.

If no reply is received a timer is set and after it the transponder is set on again for some time.

The invention is integrating the good features of the time and event driven approaches. This results in that in sparsely populated areas (hardly any activity in the ISM band) the system can work as power efficiently as a pure event driven approach and in dense populated areas (a lot of the ISM band activity) the system can work almost at as power efficiently as the pure time driven approach.

The above method optimizes the idle mode power efficiency because a) unnecessary device advertisement can be reduced, b) the device in idle mode can still fully control its idle mode duty cycle, i.e. microwave ovens cannot increase its duty cycle and c) co-existence of devices in the predefined advertisement frequency is maintained, since multiple devices are not likely to respond simultaneously after a transmission of 'wake up energy'.

It should be noted that the method can be varied by changing the order of the determination of the passive mode 46 and the detection of the wake up event 42. So in a varied method the detection of a wake up event is only possible if the timer has run out and the device has entered the initial sleep mode 40. In this case the power up mode I 44 can be used to operate the detector to detect the wake up event. The timer delay 49 can comprise a fixed or a randomly generated period of time. The timer delay can also be inserted anywhere between the detection of a wake up event 42 and the transmission of an advertisement 50. A fixed timer delay can be implemented in a very simple manner, but the random delay has the advantage that the probability for the device to repeatedly interfere with the transmissions of other devices decreases. In case it can be expected that the device is operated in an environment without other similar low power radio devices, the timer delay 49 may be omitted.

FIGS. 7 to 14 depict alternative embodiments of the method, extensions and variations to the basic method depicted in FIG. 6, in accordance with transmission protocols.

Figure 7:
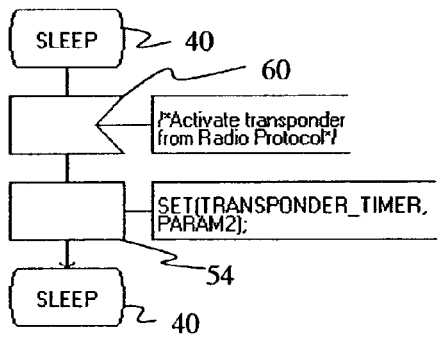
FIG. 7 depicts a variation of the method starting from the sleep mode, followed by an activation of the transponder from the radio protocol corresponding to the detection of a wake up event in FIG. 6, and activating the timer before returning to the sleep mode.

FIG. 7 depicts a variation of the method starting from the sleep mode 40, followed by an activation of the transponder 60 from the radio protocol corresponding to the detection of a wake up event in FIG. 6, and activating the timer 54 before returning to the sleep mode 40.

Figure 8:
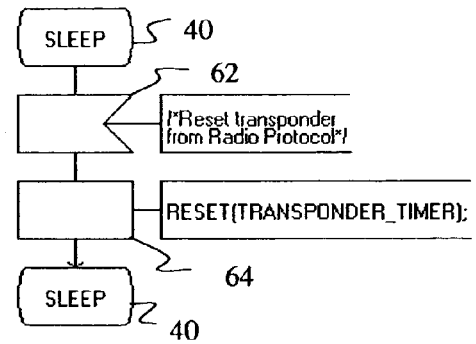
FIG. 8 depicts an extension of the method of FIG. 6, by a timer reset operation from the sleep mode.

FIG. 8 depicts an extension of the method of FIG. 6, by a timer reset operation from the sleep mode 40. The timer is reset to enable the device to be activated e.g. by a manual or automatic override of the timer. The override event is a transponder reset from the radio protocol 62, followed by a timer reset 64, and returning to a sleep mode 40.

FIG. 9 depicts another extension of the method by extending the detection of a wake up event 42 in FIG. 6. The wake up event is in this case a combination of a wake up timer run out 66, and the detection and measurement 68 of a received RF energy. If the received energy is above a determined threshold, the radio protocols are activated 71, and an advertisement is transmitted. After the transmission and a data transfer the device returns to a sleep mode 40, with or without activating the timer. If the received energy is below the determined threshold, the device activates the timer 54 and returns immediately to the sleep mode 40.

FIG. 10 depicts another extension of the method of FIG. 6. In this case the device activates the radio protocols from the transponder 72 and transmits the advertisements 50. This extension enables the device to operate in a time driven mode independently from the state of the timer. This corresponds to a direct step from the sleep mode 40 or the power up mode I 42 to power up mode II 48 in FIG. 6, without requesting the timer.

FIG. 11 depict another variation of the method of FIG. 6, wherein the transmission of the advertisement is controlled by a second timer to provide a time frame, for the advertisement and connection set up. With the activation of the advertisement, a second timer is started 74, to proceed with the connection set up for another predetermined period of time, to prevent that device tries to set up a connection endlessly.

FIG. 12 depicts another variation of the present invention, wherein the device activates the transponder 74 after a successful data transfer 41, before returning to an idle mode 41. This corresponds to a direct step from the data transfer 58 to the power up mode I 44 or the power up mode II 48 in FIG. 6.

FIG. 13 depicts another variation of the present invention, wherein the device activates the transponder 80 following to the reception of no response to the advertisement 80, before returning to an idle mode 41. This corresponds to a direct step from the response request 52 to the power up mode II 48 and to the power up mode I 44 in FIG. 6.

Figure 14:
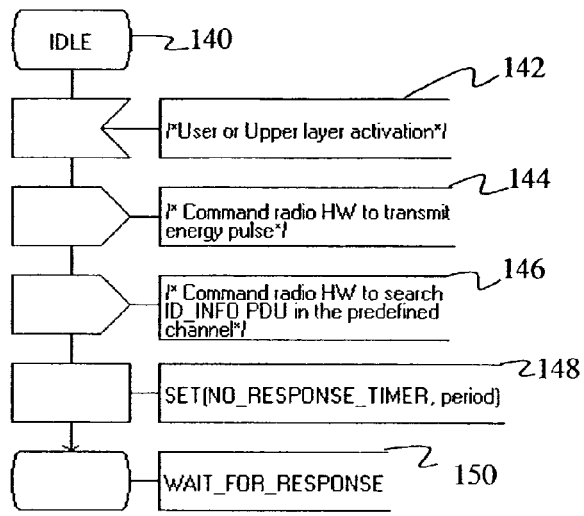
FIG. 14 depicts an illustrative example of the operations in another device necessary to setup a connection with the low power radio device.

FIG. 14 depicts an illustrative example of the operations in another device necessary to set up a connection with said low power radio device. The method starts with an idle mode 140, followed by a user or upper layer activation 142. After being activated, the device commands the radio hardware to transmit an energy impulse 144, that is intended to be perceived by the low power radio device as a wake up event. The pulse should be long enough to be surely be perceived by said low power radio device, i.e. longer than the period of the timer of the low power device (not shown). The wake up event causes the low power radio device to transmit an advertisement. To receive the advertisement, the requesting device commands its hardware to search for an advertisement in a predefined channel 146, and sets a "no response" timer period 148, for opening a timer frame for receiving an advertisement from a low power device. Within said time frame the device waits for an advertisement 150.

Figure 15:
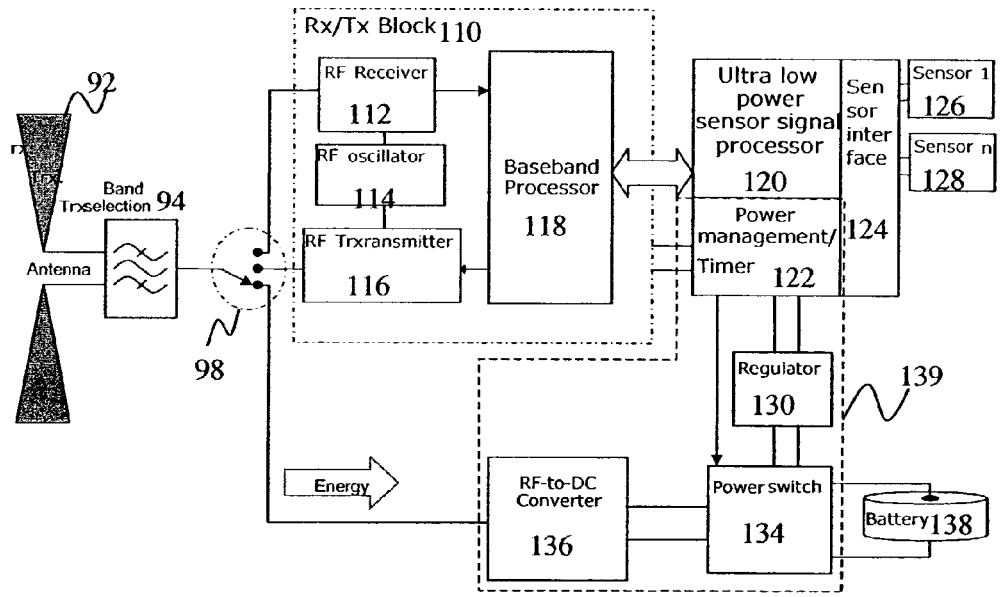
FIG. 15 describes a system according to one embodiment of the present invention.

FIG. 15 describes a system according to one embodiment of the present invention. The system comprises the following blocks:

sensors and their interface electronics 124–128
an ultra low power microcontroller 120 for sensor signal processing and for the system control
a power management block 139, and
a radio and baseband block 110 for communication.

The ultra low power microcontroller 120 is connected to the baseband block 110, for communicating with other devices. The ultra low power microcontroller 120 is connected to the sensor interface 124 for reading out the sensors, processing sensor values and transmitting sensor data via the baseband block 110.

The sensors and interfaces 124 to 128 are one example of an application for the low power radio device. Instead of the sensors 126 and 128, and the sensor interface 124, the low power radio device can comprise any other components operable by a transponder aided low power radio device, such as actuators, memories, data storage, respective interfaces, and mixtures therefrom. What kind of devices are connected to the low power microcontroller 120 depends only on the practical application of said low power radio device.

The radio and baseband block 110 comprises a baseband processor 118, a RF receiver 112, a RF transmitter 116, and a RF oscillator 114. Associated to the baseband block there is an antenna switch 98, a band selection filter 94 and an antenna 92.

The antenna switch 98 is associated to the baseband block 110 and the power management block 139. The power management block 139 can switch the antenna between the detector 136 and the baseband block 110. The antenna switch can also be operated by the baseband block 110 alone, as the antenna as the baseband block 110 can only receive or transmit, if it is in an operative state, and the hence can operate the switch.

The power management block 139 comprises a RF-to-DC converter 139, i.e., Schottky diode based converter, a power switch 134 that is used switch the battery on or off, and a regulator 130. The key functionality is related to the power switch 134 that can be activated by the DC voltage signal from the RF field via the RF-to-DC converter 139. The RF field energy activates the power switch 139 that connects the battery 139 to the regulator 130. The power management logic 122 of the system is activated.

The power management block 139 comprises a timer (not depicted), to inactivate a wake up process. The timer is controlled by the power management 122, responding to signals from the ultra low power signal processor 120. The timer is activated by power management 122, in case the power management 122 is putting said device into a sleep mode. The timer output can be connected to the input of said RF-to-DC converter 139, (e.g. by disconnecting the detector from the antenna by switching the antenna switch 98), to the RF-to-DC converter 139 itself, to inactivate the detector, or to the output of the RF-to-DC converter 139 to interrupt or short circuit the connection to the power switch 134. In another embodiment, the timer output can be connected to the power switch, to activate the power switch 134 if the timer runs out. In another embodiment, the timer can be built in the power management 122 itself, so that the power management 122 is active during the timer operation, but prevents the power management block 139 from powering up the other components of the low power device.

Figures 16, 17:
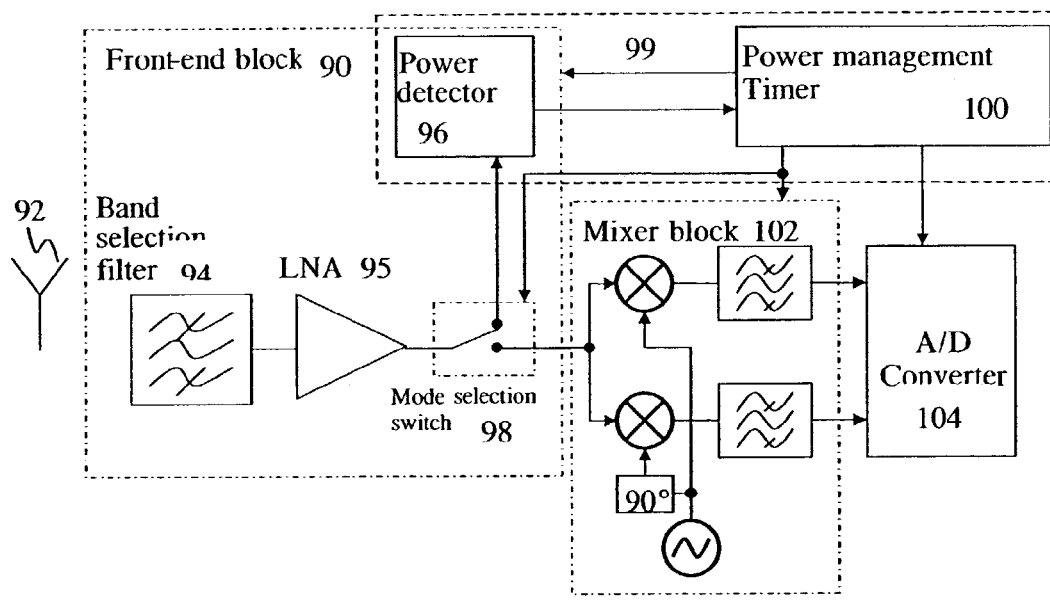
FIG. 16 is a table describing the different operative states of the system of FIG. 15, FIG. 17 describes an implementation embodiment of the system that is based on the use of the power detector to initialize the local oscillator and mixer RF receiver, and the baseband functionality.

The functional modes of the system can be divided into:
1) Deep sleep mode (battery 138 is switched off)
2) Sleep mode (battery 138 is switched on; ultra low power microcontroller 120 in sleep mode; power management block 139 on)
3) Ultra low power microcontroller 120 on; measurement(s) of sensors 126, 128 in idle state
4) Measurement mode: measurement interface 124 active; radio module 110 off
5) Communication mode: radio 110 with the baseband processor 118 are on The different modes are summarized in the table depicted in FIG. 16.

This embodiment describes a way of saving power in a short range radio by waking the battery 138 of the system with the energy extracted from the RF field of another active device that is brought to the vicinity of the low power device, typical to a distance of only a few ten centimeters or less.

FIG. 17 describes another implementation embodiment for the system. In this embodiment the system comprises a front end block 90, a power management block 99, a local oscillator and mixer RF receiver 102, and the baseband functionality 104. The Front end block comprises an antenna 92, a band selection filter 94, a low noise amplifier, a mode selection switch 98 and the power detector 96. The power detector 96 is part of the front end block and is associated to the power management block 99.

In this embodiment, the timer is comprised of the power management block 99. The timer can be connected to the power management logic 100 and can be connected e.g. to the LNA 95, to enter a deep sleep mode (or passive mode), wherein the device is fully powered down, except of the timer. The timer can be implemented as a MOSFET circuit, connected to the LNA, comprising a capacitor, a diode and a resistor, so that the capacitor can be charged via the diode, and is discharged via the resistor. The capacitor can be connected tot he gate of the MOSFET, to provide a time controlled interruption of the power supply to e.g. the LNA 95.

The system is based on the use of the power detector 96 to initialize the local oscillator and mixer RF receiver 102, and the baseband functionality 104. The power is measured after the low noise amplifier 95 at the band of interest limited by the band selection filter 94, connected to the antenna 92.

In order not the limit the operational range, an advertisement transmission may be executed periodically, unconditionally to detected energy level in the transponder. This period can e.g. be a multiple of said timer period.

Most of the power consumption of the RF module is related to long settling time periods of the local oscillators. The active communication time is a fraction of time need for setting up the local oscillator.

This embodiment of the invention describes a way to save power by using a power detector in the RF front-end that detects the energy at the band of interest without powering up the local oscillator. Thus the power detection period can be limited to much shorter time. And energy is saved.

It should be noted that the low power radio device can be fitted with sensors reacting to physical, i.e. galvanic touching of the device in idle mode, capacitive or optical based proximity sensors or movement detection or presence by sensors, to provide an alternative power up or wake up process.

According to another additional example embodiment, a method for transponder aided wake-up and connection set-up of a low power radio device is provided. The method comprises setting an advert repetition duration, an energy scanning duration and an energy measurement duration of said low power radio device. The method further comprises setting an energy threshold and measuring of received energy level once in every of said energy scanning durations. The method is characterized by putting said low power radio device into an operative mode, in case one of said advert repetition durations has expired and a wake up event is detected.

Said wake up event can be detected when the measured energy level exceeds said energy threshold during said set energy scanning duration. Said energy threshold can be set or be defined in relation to a desired operational reception range of said low power radio device. Said energy scanning duration can be set to be shorter than said advert repetition duration. Said energy measurement duration can be set to be shorter than said energy scanning duration. Said energy measurement duration can be set in relation to physical measurement accuracy of said low power radio device.

In another example embodiment of the present invention said method further defines a measurement procedure of said measuring of received energy level by activating only necessary radio components, which are needed to measure said energy level over the whole operational frequency band of said low power device. Said necessary radio components can include an antenna, a filter, a low noise amplifier, a power detector and means to convey said received energy level information to a radio control unit.

According to another example embodiment of the present invention a method for waking up a first low power device and setting up a connection to said first low power radio device with a second radio device having hardware and software capabilities to initialize connection set-up to said low power radio device is provided. Said method comprises transmitting energy for a transmit duration from the second low power device, to put said first radio device into receive mode for receiving said (advert) messages. Wherein said transmit duration of said second device can be defined to be longer than said energy scanning and energy measurement durations of said first device combined.

This application contains the description of implementations and embodiments of the present invention with the help of examples. It will be appreciated by a person skilled in the art that the present invention is not restricted to details of the embodiments presented above, and that the invention can also be implemented in another form without deviating from the characteristics of the invention. The embodiments presented above should be considered illustrative, but not restricting. Thus the possibilities of implementing and using the invention are only restricted by the enclosed claims. Consequently various options of implementing the invention as determined by the claims, including equivalent implementations, also belong to the scope of the invention.

The invention claimed is:

1. Method for transponder aided wake-up and connection set-up in a low power radio communication device comprising:
    detecting a wake up event through a radio frequency sensor interface of said low power radio device,
    putting said radio device into an operative state including powering a radio frequency communication interface in response to detection of said wake up event,
    transmitting at least one advertising message via the radio frequency communication interface,
    determining whether a response to said at least one advertising message is received through the radio frequency communication interface; and putting said low power radio device into a passive operation mode for a predetermined period of time, in the passive operation mode including shutting down the radio frequency communication interface, if it is determined that no response to said at least one transmitted advertising message is received, and ignoring subsequent wake up events detected during said predetermined period of time of passive operation mode so as to avoid using power to put said radio device into said operative state to transmit another advertising message via the radio frequency communication interface during said predetermined period of time of passive mode operation.

2. Method according to claim 1, further comprising:
    setting up a connection and transmitting data to a device, if an answer is received from said device.

3. Method according to claim 1, further comprising activating only necessary radio components, which are needed to detect said wake up event prior to said detection of said wake up event measure said energy level over the whole operational frequency band of said low power device.

4. Method according to claim 1, further comprising:
    putting said radio device into an operative state, after said predetermined period of time has expired.

5. Method according to claim 4, further comprising:
    transmitting an advertising message, after putting said radio device into an operative state.

6. Method according to claim 1, wherein said detecting said wake up event comprises
    receiving energy transmitted from another device in a determined frequency band,
    amplifying said received energy, and
    detecting the increased energy level after amplifying.

7. Method according to claim 1, wherein said detecting said wake up event comprises
    receiving transmitted energy from another device, and
    utilizing the received energy for putting said device into an operational state.

8. Method according to claim 1, wherein said detecting of said wake up event comprises receiving a sensor output from a sensor provided in said radio device in response to physical contact of a person or another device.

9. Method according to claim 1, wherein said detecting of said wake up event comprises receiving a sensor output from a proximity sensor provided in said radio device in response to the proximity of a person or another device.

10. Software tool comprising program code means stored on a computer readable medium for carrying out the method of claim 1 when said software tool is run on a computer.

11. Computer program product comprising program code means stored on a computer readable medium for carrying out the method of claim 1 when said program product is run on a computer.

12. Computer data signal embodied in a carrier wave and representing a program that instructs a computer to perform the steps of the method of claim 1.

13. Computer program product comprising program code, downloadable from a server for carrying out a method for transponder aided wake up and connection set up when said program product is run on a computer by carrying out the steps of:
    detecting a wake up event through a radio frequency sensor interface of said low power radio device,
    putting said radio device into an operative state including powering a radio frequency communication interface in response to detection of said wake up event,
    transmitting at least one advertising message via the radio frequency communication interface,
    determining whether a response to said at least one advertising message is received through the radio frequency communication interface; and
    putting said low power radio device into a passive operation mode for a predetermined period of time, in the passive operation mode including shutting down the radio frequency communication interface, if it is determined that no response to said at least one transmitted advertising message is received, and
    ignoring subsequent wake up events detected during said predetermined period of time of passive operation mode so as to avoid using power to put said radio device into said operative state to transmit another advertising message via the radio frequency communication interface during said predetermined period of time of passive mode operation.

14. Low power radio device capable of transponder enabled wake-up and connection set-up comprising:
    a transponder adapted to respond to received radio transmission for setting up a radio connection for transmitting data, said transponder comprising:
    a transceiver adapted to transmit and receive data and a transponder controller connected to said transceiver,
    a state controller adapted to control the operative state of said low power radio device, said state controller comprising:
    a detector adapted to detect a wake up event in a sleep mode of said low power radio device and to notify said state controller to put said device into an operative state if a wake up event is detected, wherein said state controller is connected to said transponder and is adapted to put said low power device to a sleep mode, according to signals received from said transponder, wherein said state controller further comprises a timer, said timer being adapted to be active for a predetermined period of time, wherein said timer is adapted to be activated by said state controller when the low power device is put to a passive mode, and said state controller is adapted to be inactive while said timer is active so as to avoid said transponder responding to said received radio transmission while in said passive mode.

15. Low power radio device to claim 14, further comprising a data interface connected to said transponder controller, being adapted to exchange data with components connected to said transponder controller.

16. Low power radio device according to claim 14, further comprising a battery and a power switch connected to said state controller, and said battery, adapted to connect and disconnect a battery to said low power radio device.

17. Low power radio device according to claim 16, wherein said low power radio device comprises a fully operative state, a fully powered down state and at least one partially operative state.

18. Low power radio device according to claim 14, wherein said state controller further comprises at least one sensor responding to physical proximity.

19. Low power radio device according to claim 14, wherein said transceiver further comprises an antenna switch connected between said transceiver, said detector and an antenna of said transceiver, being adapted to connect said antenna with said transceiver or with said detector, and wherein said state controller is connected to said antenna switch to operate said antenna switch.

20. Low power radio device according to claim 19 further comprising an amplifier connected between said antenna and said antenna switch.

* * * * *

UNITED STATES PATENT AND TRADEMARK OFFICE
CERTIFICATE OF CORRECTION

PATENT NO. : 7,072,697 B2 Page 1 of 1
APPLICATION NO. : 10/279741
DATED : July 4, 2006
INVENTOR(S) : Antti Lappeteläinen et al.

It is certified that error appears in the above-identified patent and that said Letters Patent is hereby corrected as shown below:

In column 15, line 53, (claim 3, line 4) after "event", --,-- should be inserted.

Signed and Sealed this

Third Day of April, 2007

JON W. DUDAS
*Director of the United States Patent and Trademark Office*